Feb. 3, 1948.  R. G. LE TOURNEAU ET AL  2,435,451
HEADSTOCK AND CENTERING REST ASSEMBLY
Original Filed Dec. 28, 1942  2 Sheets-Sheet 2

INVENTORS
R. G. Le Tourneau,
Carl Graham, H. G. Huth
BY
ATTYS

Patented Feb. 3, 1948

2,435,451

UNITED STATES PATENT OFFICE 2,435,451

HEADSTOCK AND CENTERING REST ASSEMBLY

Robert G. Le Tourneau, Peoria, Ill., and Carl Graham and Herman G. Huth, Toccoa, Ga., assignors to R. G. Le Tourneau, Inc., Stockton, Calif., a corporation of California Substituted for abandoned application Serial No. 470,352, December 28, 1942. This application March 24, 1947, Serial No. 736,772

7 Claims. (Cl. 77—3)

This invention relates in general to machine lathe construction, and in particular the invention is directed to, and it is the principal object to provide, a lathe which embodies an improved headstock and centering rest in unique assembly.

Another object of this invention is to provide, in combination in a lathe, a headstock including a driven rotary mandrel, an axially spaced centering rest including a rotary collar, the mandrel and collar being relatively movable axially, and a separate taper roller bearing arranged with both the headstock mandrel and centering rest collar; said bearings being disposed in facing relation, but with their thrusts away from each other, whereby the bearings are placed under thrust upon engagement of work between said mandrel and collar.

An additional object of this invention is to provide a lathe headstock of novel construction; said headstock including a rotatable and axially slidable mandrel, a fluid actuated power cylinder, and a drive pulley; said power cylinder being connected to the mandrel to effect axial sliding movement thereof, and said pulley being arranged in driving relation with said mandrel.

It is also an object of the invention to provide a centering rest of novel construction, said centering rest including a rotary work-supporting and centering collar into which one end portion of the work projects in symmetrical and frictional engagement; said collar being supported by an anti-friction bearing and retained within a bed-mounted cage.

A still further object of the invention is to provide a lathe which includes, in combination, a headstock having a power driven and advanced mandrel, a work supporting and centering head on the outer end of the mandrel, a longitudinally movable power advanced tool supporting carriage disposed in axially spaced relation to the headstock, and a centering rest mounted between the headstock and carriage, said centering rest including a rotary collar into which one end portion of the work projects in symmetrical and frictional engagement.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views.

Figure 1:
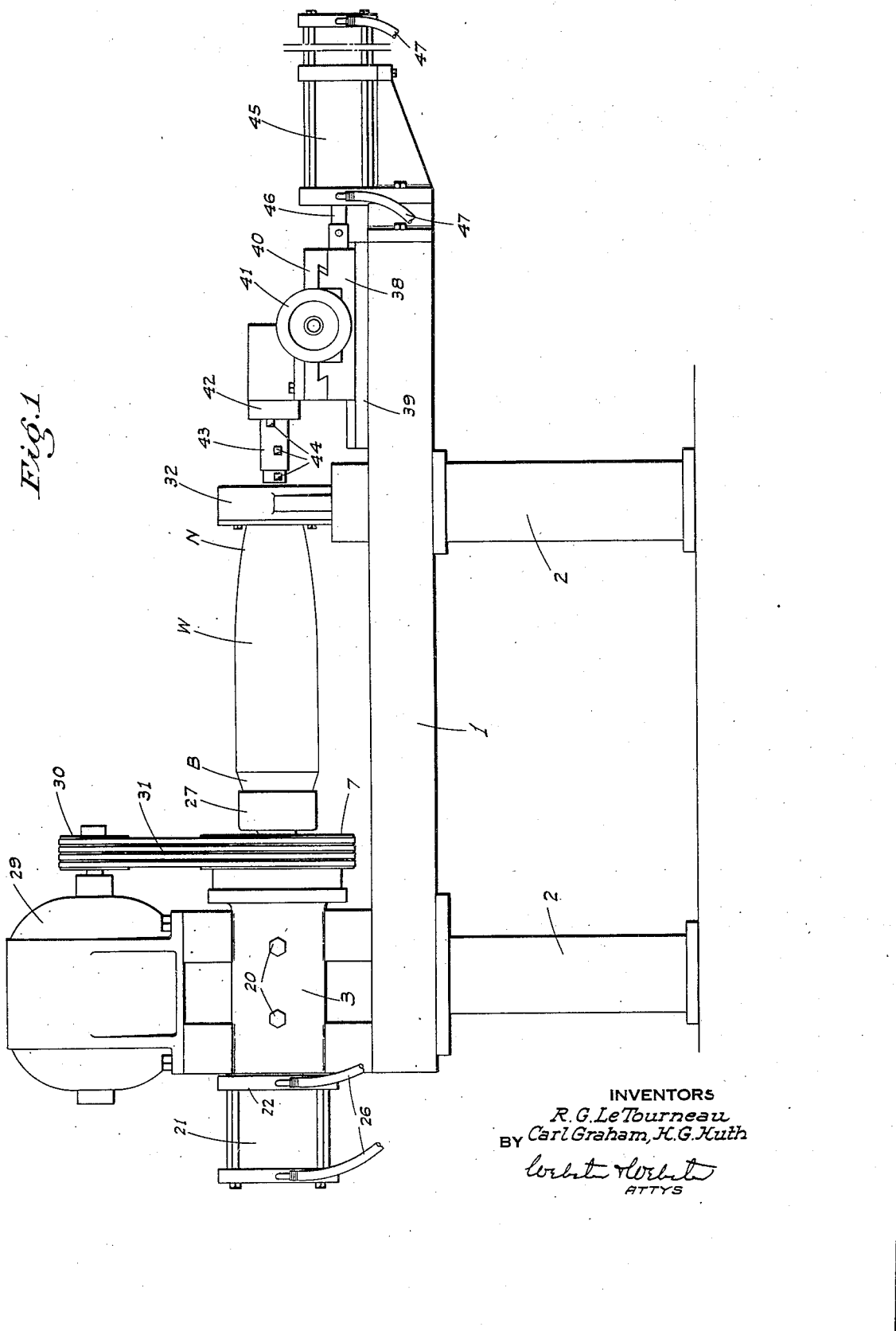
Figure 1 is a side elevation of a lathe embodying the invention.
Figure 2:
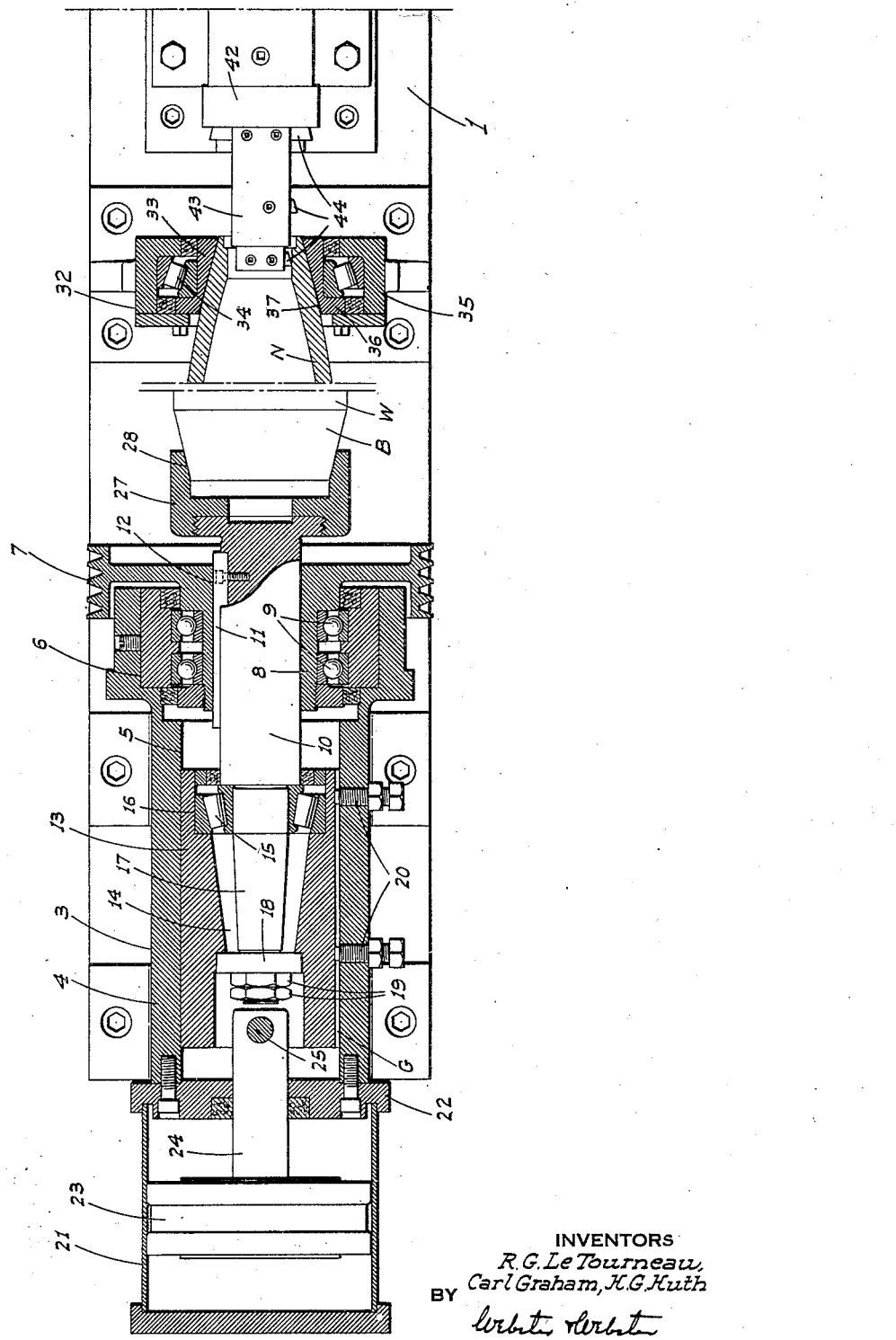
Figure 2 is a fragmentary sectional plan of a lathe embodying the invention; the lathe being foreshortened between the headstock and centering rest.

Referring now more particularly to the characters of reference on the drawings, the lathe comprises an elongated horizontal bed I supported above the floor by legs 2; such bed being flat-topped.

A headstock, indicated generally at 3, is mounted on the bed I at one end thereof and comprises a head block 4 formed with a horizontal cylindrical bore 5 which extends longitudinally of the lathe; said bore being initially open at its ends. The head block 4 at its inner end and beyond the bore 5 is formed with an enlarged annular bore 6.

A pulley 7 is disposed adjacent the inner end of the head block 4 and includes a hub 8 which projects axially into the enlarged bore 6. Ball bearings 9 support the hub 8 in the bore 6 in rotatable but axially immovable relation. A mandrel 10 projects with a running fit through the hub and is connected thereto in non-rotatable but relatively axially slidable relation by means of a key 11 fixed on the mandrel riding in a longitudinal slot 12 in the hub. A plunger 13 is slidably disposed in bore 5, said plunger having an axial opening 14 extending from end to end thereof. A taper roller bearing 15 is fitted in a seat 16 in the end of opening 14 adjacent hub 8. The inner end of the mandrel seats against the bearing 15, and a spindle 17 projects from said inner end of the mandrel through bearing 15 and thence extends some distance within opening 14. Adjacent its free end the spindle 17 is threaded and projects through a bearing unit 18 seated in opening 14. Nuts 19 on the threaded end portion of the spindle 17 abut the outer face of bearing 18. By virtue of the above arrangement the spindle 17 and mandrel 10, while rotatable relative to the plunger 13, are retained against relative axial separation. Adjustment cap screws 20 are threaded radially through the head block into bore 5 and engage a groove G in the plunger 13 to prevent rotation of said plunger.

The outer end of the head block 4 is fitted with a fluid actuated power cylinder 21 whose inner end plate or cap 22 is bolted to the adjacent end of the head block and forms a closure for the initially open end of bore 5. A piston 23 is enclosed in the power cylinder 21, and a piston rod 24 extends axially from said piston through cap 22 into the adjacent end of opening 14 in plunger 13. A cross pin 25 connects the piston rod to the plunger for limited universal action. The power cylinder 21 is double acting, and fluid under pressure is fed to opposite ends thereof by conduits 26 from a control valve (not shown).

At the end adjacent pulley 7, the mandrel is fitted with a driving head 27 adapted to support and center one end of the work W. This driving head is of cup-like configuration with the cup tapering inwardly, as at 28, for the reception of a correspondingly tapered end of the work.

In the present instance, the work W is shown as an ordnance shell whose base B, as well as its nose N, are tapered.

An electric motor 29 is mounted on top of head block 4 with the drive shaft parallel to the mandrel. The pulley 7 of the headstock is of multiple-sheave type and is driven from motor 29 by a speed reduction, multiple-sheave pulley 30, and multiple drive belts 31.

A work supporting and center rest, indicated generally at 32, is mounted in upstanding position on the bed 1 of the lathe in axially alined but spaced relation to the headstock; such centering rest comprising a rotary collar 33 supported by a taper roller bearing 34 seated in an annular cage 35; the collar being annularly flanged, as at 36, and retained by said cage and bearing against axial movement. The face 37 of the opening in the collar is formed to symmetrically and frictionally engage and support the adjacent end of the work W, here shown as the nose N of an ordnance shell.

Beyond the centering rest 32 the lathe includes a longitudinally movable carriage 38 supported by ways 39; said carriage including a cross slide 40 whose traversing movement is controlled by a hand wheel 41 in the conventional manner. A tool holder 42 is mounted on the cross slide and supports a tool bar 43. This tool bar, in the present instance, includes three axially spaced removable cutters 44 arranged to bore, counterbore and face the nose N of the ordnance shell with advance of the tool bar 43 toward the work.

The carriage 39 is power advanced and retracted by means of a fluid actuated power cylinder 45 mounted in connection with the bed 1 outwardly of the carriage; a piston rod 46 projecting from the cylinder to connection with said carriage. The power cylinder 45 is double acting and fluid is fed to opposite ends thereof by conduits 47 from a control valve (not shown).

*Operation*

In operation of the lathe the mandrel 10 and carriage 38 are initially retracted by the power cylinders 21 and 45 respectively. The work W is then brought into position and the cylinder 21 actuated to advance the driving head 27. This causes the taper base B and the taper nose N of the work to frictionally engage in supported and centered relation in the cup-like driving head 27 and the rotary collar 33 respectively.

When the work is thus engaged and supported for the machining operation, the thrust from opposite ends of the work is imparted to the facing taper roller bearings 15 and 34, which are mounted with their thrusts away from each other. This particular taper roller bearing arrangement, with the thrusts of the opposed bearings 15 and 34 away from each other, is one of the unique features of the lathe, as it permits the forceful engagement of the work between the driving head 27 and the rotary collar 33.

After the work is positioned for machining, the motor 29 is started, and the carriage 38 then advanced by the power cylinder 45 so that the tool bar 43 enters the nose N of the work to effect, in sequence, the boring, counterboring, and facing thereof.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

This application is a substitute for Serial No. 470,352, filed December 28, 1942, now abandoned.

Having thus described our invention, what we claim as new and useful and desire to secure by Letters Patent is:

1. In a lathe, a mandrel having a work engaging head on one end thereof, means mounting the mandrel for rotation and axial movement, an axially immovable, driven pulley, and a power cylinder; the pulley surrounding the mandrel in direct driving but relatively slidable relation, and the power cylinder being axially alined and connected with the mandrel to effect axial sliding movement thereof independently of said pulley.

2. In a lathe, a headstock comprising a headblock having a horizontal longitudinal bore therethrough, a driven pulley disposed at one end of the bore, said pulley including a hub projecting into the adjacent end of the bore, anti-friction bearings in said end of the bore supporting the hub, a mandrel projecting through the hub, means connecting the mandrel with the hub in driven relation but for relative axial movement, a power cylinder mounted on the headblock in axial alinement with said bore and extending from the other end thereof, a piston rod projecting from the cylinder into said bore, and means connecting adjacent ends of the piston rod and mandrel; said last named means comprising a plunger slidably disposed in the bore, a spindle connecting the mandrel and plunger in relatively rotatable relation, and means connecting the piston rod to said plunger.

3. Apparatus as in claim 2 in which the plunger is formed with a longitudinal opening, a taper roller bearing seated in the end of said opening adjacent the mandrel, the mandrel abutting against said bearing and the spindle projecting through the latter, and another bearing fixed in said opening in spaced relation to said taper roller bearing, the spindle being supported by said other bearing in rotary but axially immovable relation.

4. A lathe headstock comprising a headblock having a horizontal longitudinal bore therethrough, a plunger slidably disposed in the bore, a mandrel having a work engaging and supporting member on its outer end, the mandrel extending axially into the bore at one end of the headblock, means separate from the plunger mounting said mandrel in the bore for rotation and axial sliding movement, means connecting the inner end of the mandrel in rotatable but axially inseparable relation to the plunger, an axially immovable driven rotary element surrounding the mandrel adjacent said one end of the headblock, means connecting said rotary element with the mandrel in direct driving but relatively slidable relation, a power cylinder mounted in connection and axially alined with the other end of the headblock, a piston rod projecting into the headblock bore from the power cylinder, and means connecting adjacent ends of said rod and plunger.

5. A lathe headstock comprising a headblock having a horizontal longitudinal bore therethrough, a plunger slidably disposed in the bore, a mandrel having a work engaging and supporting member on its outer end, the mandrel extending axially into the bore at one end of the headblock, means separate from the plunger mounting said mandrel in the bore for rotation and axial sliding movement, means connecting the inner end of the mandrel in rotatable but axially inseparable relation to the plunger, an axially immovable driven rotary element surrounding the mandrel adjacent said one end of the headblock, means connecting said rotary element with the mandrel in direct driving but relatively slidable relation, a power cylinder mounted in connection and axially alined with the other end of the headblock, a piston rod projecting into the headblock bore from the power cylinder, and means connecting adjacent ends of said rod and plunger; said mandrel mounting means comprising an axially inwardly extended hub projecting from the rotary element into the bore from said one end of the headblock, and anti-friction bearings between said hub and the headblock.

6. A device as in claim 5 in which said rotary element connecting means comprises a spline connection between the mandrel and said hub.

7. A device as in claim 4 including means between the plunger and headblock operative to prevent rotation of said plunger without limiting normal axial sliding movement thereof.

ROBERT G. LE TOURNEAU.
CARL GRAHAM.
HERMAN G. HUTH.